(12) United States Patent
Nishimura

(10) Patent No.: US 8,913,284 B2
(45) Date of Patent: Dec. 16, 2014

(54) MEDIA PROCESSING DEVICE AND SYSTEMS WITH MULTIPLE PROCESSING UNITS

(71) Applicant: Seiko Epson Corporation, Tokyo (JP)

(72) Inventor: Hideki Nishimura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

(21) Appl. No.: 13/870,839

(22) Filed: Apr. 25, 2013

(65) Prior Publication Data

US 2013/0314725 A1 Nov. 28, 2013

(30) Foreign Application Priority Data

May 22, 2012 (JP) ................................. 2012-116881
May 24, 2012 (JP) ................................. 2012-118313

(51) Int. Cl.
*G06F 3/12* (2006.01)
*G06Q 20/20* (2012.01)
*G07G 5/00* (2006.01)

(52) U.S. Cl.
CPC ............ *G06F 3/1281* (2013.01); *G06Q 20/202* (2013.01); *G06Q 20/209* (2013.01); *G06F 3/1204* (2013.01); *G07G 5/00* (2013.01); *G06F 3/1291* (2013.01); *G06F 3/1206* (2013.01); *G06F 3/126* (2013.01); *G06F 3/1284* (2013.01)

USPC .......................... 358/1.6; 358/1.13; 358/1.15

(58) Field of Classification Search
USPC .......................... 358/1.6, 1.13, 1.15
See application file for complete search history.

(56) References Cited

U.S. PATENT DOCUMENTS

| 8,033,452 B2 | 10/2011 | Koakutsu |
| 8,215,544 B2 | 7/2012 | Koakutsu |
| 2010/0245905 A1* | 9/2010 | Nishimura ................... 358/1.15 |
| 2012/0243046 A1 | 9/2012 | Koakutsu |

FOREIGN PATENT DOCUMENTS

JP 2009-199588 A 9/2009

* cited by examiner

*Primary Examiner* — Qian Yang

(57) ABSTRACT

A roll paper print unit 120 processes roll paper. A first interface 110 receives commands transmitted from a POS terminal 20. A second interface 115 transmits a command received by the first interface 110 to a printer 200 that performs a same process as the roll paper print unit 120. A control unit 150 controls processing by the roll paper print unit 120, and transmitting a command to the printer 200 through the second interface 115, based on the received command. When the received command is a preset command, the control unit 150 controls the second interface 115 to transmit the preset command to the printer 200.

14 Claims, 6 Drawing Sheets

MEDIA PROCESSING DEVICE AND SYSTEMS WITH MULTIPLE PROCESSING UNITS

BACKGROUND

1. Technical Field

The present invention relates to a media processing device and a POS system.

The present application claims the priority of Japan Patent Application No. 2012-116881, filed on May 22, 2012, and Japan Patent Application No. 2012-118313 filed on May 24, 2012, all contents of which are herein incorporated by reference.

2. Related Art

A printer as an example of a media processing device, and a POS (point-of-sale) systems having a plurality of printers, are known from the literature. See, for example, Japanese Unexamined Patent Appl. Pub. JP-A-2009-199588. In the system described in JP-A-2009-199588, a receipt printer (first printer) that prints receipts is connected to a POS register, and a label printer that prints labels is connected to the first (receipt) printer. When the POS register outputs transaction data, the receipt printer prints a receipt. The receipt printer also outputs print data for producing a label if a specific condition is met. The label printer then prints a label based on the print data for a label output by the receipt printer.

Both a dedicated receipt printer for printing receipts, and a dedicated label printer for printing labels, are thus connected in the foregoing system of the related art. In other words, dedicated media processing devices used for different processes are connected. Because each of the media processing devices is used for a fixed purpose, there is no need to control how the media processing devices are used.

However, when the system has plural media processing devices with common functions connected, controlling which media processing device operates under what conditions is required. A computer or other control device that controls the media processing devices is therefore required to control each of the plural media processing devices.

SUMMARY

The present invention is directed to this problem, and provides a simple method of appropriately using plural media processing devices.

A media processing device according to one aspect of the invention includes a processing unit that processes media; a first connection unit that receives a command sent from a host computer; a second connection unit that transmits a command received by the first connection unit; and a control unit that controls executing a process by the processing unit based on a command received by the first connection unit, or controls transmitting a command received by the first connection unit from the second connection unit.

The media processing device according to this aspect of the invention can receive commands sent from a host computer and process media based on the received commands using an appropriate processing unit, and can send predetermined commands to an external processing device to process the media by the external processing device, for example. As a result, if the host computer sends a command to the media processing device of the invention, the media processing device processes the media or appropriately sends the command to an external processing device. There is therefore no need for the host computer to differentiate control for the media processing device and the external processing device, and plural processing devices can be easily controlled and used appropriately.

In addition to the first connection unit that connects to the host computer, the media processing device according to another aspect of the invention also has a second connection unit that connects to an external processing device. As a result, the host computer can output commands in the same way as when one media processing device is connected. A special function or software configuration is therefore not needed in the host computer in order to use a plurality of processing devices. For example, existing host computers can be used without modification.

In a media processing device according to another aspect of the invention, the control unit sends commands that are received by the first connection unit and executed by the external processing device through the second connection unit to the external processing device.

In this aspect of the invention the media processing device sends commands that are received from the host computer and executed by the external processing device to the external processing device. As a result, when the host computer outputs a command, the external processing device can be operated by a function of the media processing device. The host computer can therefore easily control and appropriately use a plurality of processing devices.

A media processing device according to another aspect of the invention also has a second processing unit that executes a different process than the processing unit; and an external device control unit that detects a process that can be executed by an external processing device. When the control unit causes the second processing unit to execute a command that is included in the commands received by the first connection unit and can be executed by the second processing unit when the external device control unit detects that the external processing device does not have the same processing unit as the second processing unit.

In this aspect of the invention the media processing device has a processing unit and a second processing unit that executes different processes, and can detect the process that can be executed by the external processing device. When the media processing device detects that the external processing device does not have a processing unit equivalent to the second processing unit, the command received from the host computer is executed by the second processing unit. More specifically, the second processing unit executes commands that cannot be executed by the external processing device. As a result, the host computer can execute processes that can be executed by the external processing device on the external processing device, and can execute other processes on the media processing device, by simply sending a command. More specifically, the media processing device can appropriately operate the external processing device based on the function of the external processing device. The host computer can therefore appropriately use a plurality of processing devices without executing control matching the functions of the processing devices.

A media processing device according to another aspect of the invention preferably also has a switching unit that, when a command received by the first connection unit is a command can be executed by the processing unit and the external processing device, changes to a first mode that executes the command by the processing unit, or a second mode that transmits the command by the second connection unit to the external processing device.

In this aspect of the invention the media processing device can change the processing device that executes commands that can be executed by both the media processing device and the external processing device. For example, the host computer can cause the media processing device to change the device that executes a command. In addition, the media processing device can change the device that executes a command according to specific conditions. Therefore, the host computer can selectively use the media processing device and the external processing device according to the purpose or content of a process without complicated control.

Another aspect of the invention is a media processing system including a terminal that transmits a command; a first media processing device including a first processing unit that applies a first process to a recording medium, a first connection unit that receives a command transmitted from the terminal, a control unit that controls executing a process by the first processing unit based on the command received by the first connection unit, or controls transmitting the command received by the first connection unit, and a second connection unit that transmits the command when the control unit executes control to transmit the command; and a second media processing device including a receiving unit that connects to the second connection unit of the first media processing device and receives the command transmitted from the second connection unit, and a media processing unit that executes a same process as the first processing unit of the first media processing device based on the command received by the receiving unit.

In the media processing system according to this aspect of the invention, the first media processing device can receive commands sent from a terminal, and the first media processing device can process the medium, and send predetermined commands to the second media processing device so that the second media processing device processes the medium, for example. As a result, if the terminal sends a command, the first and second media processing devices can appropriately process the command. The terminal can therefore easily control appropriately using plural media processing devices without needing to control how the first and second media processing devices are used.

In addition to the first connection unit that connects to the terminal, the first media processing device in another aspect of the invention also has a second connection unit that connects to a second media processing device. As a result, because the terminal can output commands in the same way as when controlling the first media processing device, the terminal does not need to be configured with a special function or software in order to use a plurality of media processing devices. For example, existing terminals can be used without changing their configuration.

In a media processing system according to another aspect of the invention, the first processing unit of the first media processing device is a print unit that prints on roll paper, and the second processing unit is a reading unit that reads information recorded on cut-sheet media.

The media processing system according to this aspect of the invention can appropriately use and execute processes on the first media processing device that can execute a process of printing on roll paper and a process of reading information recorded on cut-sheet media, and the second media processing device that executes at least one of the same processes as the first media processing device.

In a media processing system according to another aspect of the invention, the second media processing device has a second media processing unit different from the above media processing unit, and the control unit of the first media processing device executes on the first processing unit or the second processing unit commands received by the first connection unit that relate to a function that the second media processing device cannot execute and can be executed by the first processing unit or the second processing unit.

In this aspect of the invention the first media processing device can execute different types of processes, and can detect processes that the second media processing device cannot execute. The first media processing device executes commands that are sent from the POS terminal but cannot be executed by the second media processing device. As a result, the POS terminal can cause the second media processing device to execute processes that the second media processing device can execute, and can cause the first media processing device to execute other processes, by simply sending a command. More specifically, the first media processing device can appropriately operate the second media processing device according to the functions of the second media processing device. The POS terminal can therefore appropriately use a plurality of media processing devices without executing control matched to the functions of the first and second media processing devices.

Another aspect of the invention is a media processing device including a processing unit that processes media, a first connection unit that receives a command sent from a host computer, a second connection unit that sends a command received by the first connection unit to an external processing device that performs a same process as the processing unit, and a control unit that switches based on a command received by the first connection unit between a first mode in which a command received by the first connection unit is executed by the processing unit, and a second mode in which a command received by the first connection unit is sent by the second connection unit to the external processing device.

The media processing device according to this aspect of the invention can thus receive a command sent from the host computer, and based on the received command execute an operating mode that processes media with the processing unit, or an operating mode that sends the command to an external processing device and causes the external processing device to process the media, for example. Based on the command received from the host computer, the media processing device changes the operating mode. As a result, by sending a command to the media processing device, the host computer can cause the media processing device to process media, or cause the media processing device to pass the command to an external processing device. The host computer can thus appropriately use a plurality of processing devices without executing complicated control.

A media processing device according to another aspect of the invention preferably also has a conversion unit that converts a command received by the first connection unit to a first executable command that is executed by the processing unit, or a second executable command that is executed by the external processing device.

The media processing device according to this aspect of the invention can thus convert a command received from the host computer to a command that is executed by the processing unit or the external processing device. As a result, the host computer can appropriately use the media processing device and external processing device without modifying a command even if the media processing device or external processing device is connected to a host computer that uses different commands.

Another aspect of the invention is a POS system including: a POS terminal that transmits transaction information and a command; a first printing device including a first connection unit that receives transaction information and a command transmitted from the POS terminal, a first print unit that prints a receipt, a control unit that executes a first mode wherein the first print unit executes the command received by the first connection unit and prints the transaction information on a receipt, or a second mode wherein the transaction information received by the first connection unit is transmitted, and a second connection unit that transmits the transaction information when the control unit operates in the second mode; and a second printing device including a receiving unit that connects to the second connection unit of the first printing device and receives the transaction information, and a second print unit that prints the transaction information received by the receiving unit on a receipt.

In a POS system according to this aspect of the invention, the first printing device can receive a command sent from the POS terminal, and can execute a first mode to print on roll paper based on the received command, and a second mode that sends the command to the second printing device and causes the second printing device to print on roll paper. Because the first printing device changes the operating mode to the first mode or second mode based on a command sent from the POS terminal, the POS terminal can appropriately switch the printing device that prints on roll paper to either the first or second printing device by sending a command. A plurality of printing devices can therefore be operated appropriately without requiring complicated control.

In a POS system according to another aspect of the invention, the first printing device includes a conversion unit that converts a command received by the first connection unit to a first executable command that is executed by the first print unit, or a second executable command that is executed by the second printing device.

The conversion unit in a POS system according to this aspect of the invention can thus convert a command received from the POS terminal to a command that is executed by the first print unit or the second printing device. As a result, the POS system can appropriately use first and second printing devices without modifying a POS terminal command even if the first printing device or second printing device is connected to a POS terminal that uses different commands.

In a POS system according to another aspect of the invention, when the control unit of the first printing device executes the first mode, the first print unit prints the transaction information received by the first connection unit on a receipt, and the second connection unit does not transmit the transaction information to the second printing device.

Because the transaction information is not sent to the second printing device when the first printing device prints a receipt, the second printing device does not print a receipt. Because the first printing device and second printing device are thus operated exclusively to print a receipt, duplicate printing of a receipt with the same transaction information can be prevented, and reliability can be improved for a POS system that outputs transaction information.

In a POS system according to another aspect of the invention, when the control unit of the first printing device executes the second mode, the conversion unit converts the command received by the first connection unit to the second executable command, the second connection unit transmits the transaction information and second executable command to the second printing device, and the second printing device receives the second executable command through the receiving unit, and prints the transaction information on a receipt by the second print unit based on the second executable command.

In the second operating mode, the first printing device in this aspect of the invention converts the command received from the POS terminal to a second executable command that is executed by the second printing device, and the second printing device executes this second executable command. As a result, the second printing device can be connected to a POS terminal that uses different commands and still be appropriately used by the POS terminal without modifying a POS terminal command.

The invention thus enables a host computer to appropriately use a plurality of processing devices without executing control specific to the plural processing devices.

Other objects and attainments together with a fuller understanding of the invention will become apparent and appreciated by referring to the following description and claims taken in conjunction with the accompanying drawings.

DESCRIPTION OF EMBODIMENTS

Embodiment 1

Configuration of a POS System

Figure 1:
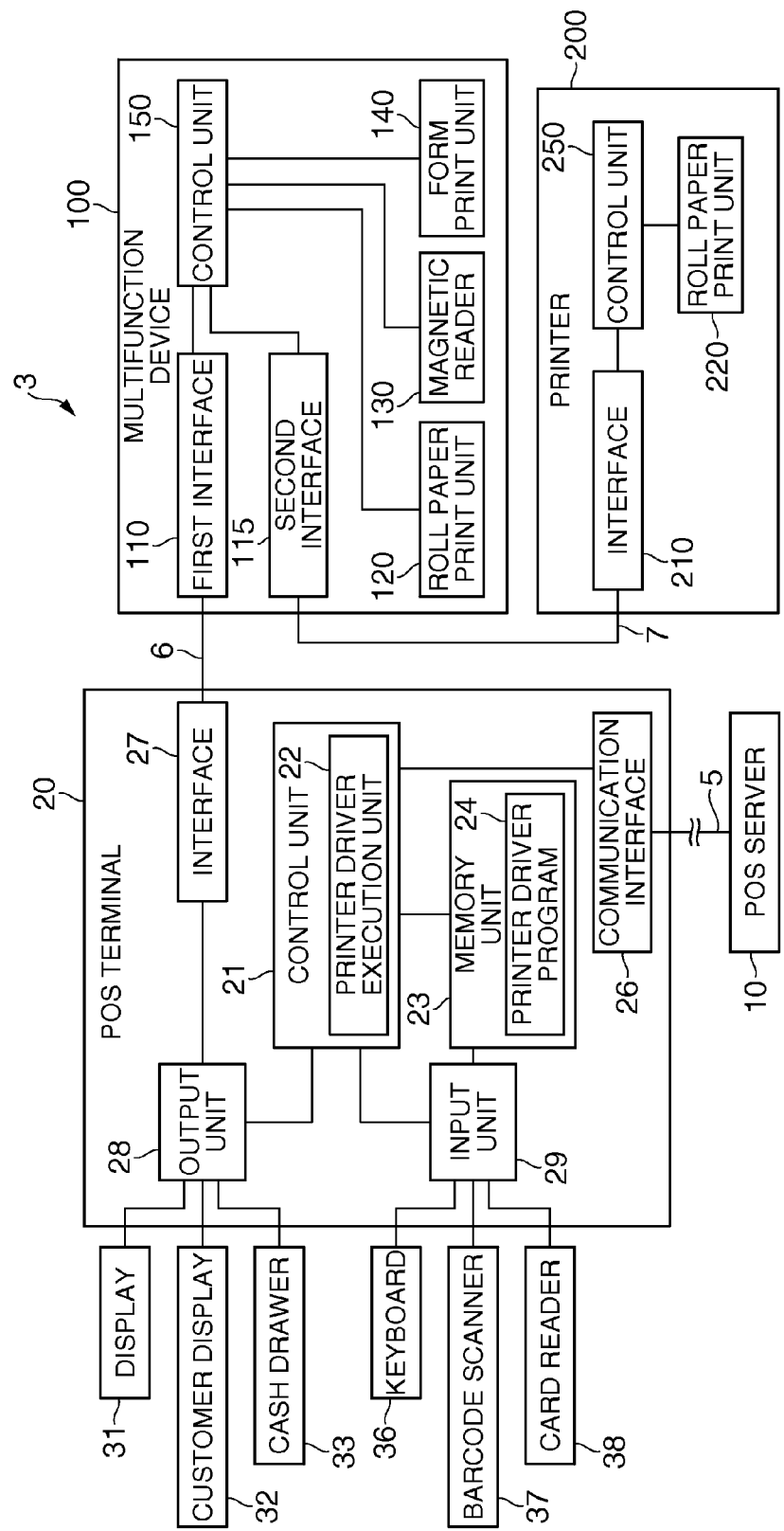
FIG. 1 is a function block diagram of a POS system according to a first embodiment of the invention.

A POS system according to a first embodiment of the invention is described below with reference to FIG. 1. FIG. 1 is a block diagram showing the configuration of a POS system according to the first embodiment of the invention.

A POS system 3 is typically installed in a retail store, for example, and used to register sales data, process transactions, and print receipts at the point of sale. As shown in FIG. 1, the POS system 3 includes a POS terminal 20 (host computer) operated by an operator, a multifunction device 100 (media processing device, or first media processing device) connected to the POS terminal 20, and a printer 200 (external processing device, or second media processing device) connected to the multifunction device 100.

Connected to the POS terminal 20 are an operator display 31 that displays information for the operator, a customer display 32 that displays price and transaction information for the customer, a cash drawer 33 that holds cash and other payment instruments, a keyboard 36 that is used by the operator, a barcode scanner 37 used to read product barcodes, and a card reader 38 used to read magnetic information recorded on magnetic stripe cards such as credit cards and cash cards. The operator inputs product information by operating the keyboard 36 and using the barcode scanner 37 to read barcodes. The POS terminal 20 then queries a POS server 10 based on the input product information. The POS server 10 searches a product master database based on the product information sent from the POS terminal 20, and returns product code, product name, price, and other product information from the master database to the POS terminal 20. The POS terminal 20 then displays product price information on the display 31 and customer display 32 based on the information returned from the POS server 10. When this process is completed for all products purchased in a transaction, the operator executes a transaction process by operating the keyboard 36, for example, and makes change from the cash drawer 33 as may be necessary. The POS terminal 20 then controls the multifunction device 100 or printer 200 to print and output a receipt.

The multifunction device 100 has a function for printing receipts on roll paper used as a recording medium. The multifunction device 100 also has a magnetic reader function for reading information magnetically recorded on checks and other forms, and a validation function for printing that a check or other form was used, for example. When a customer uses a check for payment in a sales transaction, the operator sets the check in the multifunction device 100 to read the magnetic information from the check. The multifunction device 100 then reads the magnetic information from the check and completes validation printing. The POS terminal 20 completes transaction processing based on the information read by the multifunction device 100.

The printer 200 has a function for printing receipts from roll paper. The multifunction device 100 and printer 200 could be thermal printers that print receipts on thermal roll paper, or serial dot impact or inkjet printers that print on plain roll paper.

The POS terminal 20 also has a control unit 21 that controls parts of the POS terminal 20. The control unit 21 includes CPU, RAM, ROM, and other peripheral circuits not shown, and runs a program stored in a memory unit 23. The control unit 21 includes a printer driver execution unit 22 that executes a printer driver program 24 stored in the memory unit 23.

The printer driver execution unit 22 generates and sends print data for printing receipts and commands telling a printer connected to the interface 27 to print. The printer driver execution unit 22 executes a printer driver program 24 that is written for a printer or a specific device from a specific manufacturer. As a result, the commands and print data generated by the printer driver execution unit 22 are print data and commands in the command set of a printer from a specific manufacturer or a specific model. The printer driver program 24 could also be a generic printer driver. More specifically, the commands and print data generated by the printer driver execution unit 22 could also be a print data and commands in command languages that are compatible with printers from plural different manufacturers or plural different models.

This first embodiment of the invention describes an implementation in which the multifunction device 100 and the printer 200, or at least the printer 200, is incompatible with the printer driver program 24, or more specifically a situation in which at least the printer 200, and possibly both the multifunction device 100 and the printer 200, cannot execute the commands output by the printer driver execution unit 22.

This situation occurs, for example, when the printer driver program 24 is a printer driver program that is compatible with different models than the multi function device 100 and printer 200 or with printers or devices from different manufacturers, or the printer driver program 24 is a generic printer driver and the multifunction device 100 and printer 200, or the printer 200, require a dedicated printer driver program 24.

As shown in FIG. 1, the POS terminal 20 includes an output unit 28 with connectors (not shown in the figure) to which the operator display 31, customer display 32, and cash drawer 33 are connected. The output unit 28 outputs display data from the output unit 28 to the display 31 and customer display 32 as controlled by the control unit 21. The output unit 28 also outputs to the cash drawer 33 a signal that opens the cash drawer 33 as controlled by the control unit 21. The output unit 28 could also have a function for detecting the state (open or closed) of the cash drawer 33, and outputting the result to the control unit 21. An interface 27 to which an external printer is connected is also connected to the output unit 28.

The interface 27 has a connector (not shown in the figure) conforming to a particular standard such as USB, RS-232C, or Ethernet (R), and connect to a printer by a cable connected to this connector. The interface 27 could also be a wireless communication interface enabling connecting a printer through a wireless connection. Examples of the wireless communication standard include IEEE 802.11, wireless USB, Bluetooth (R), and UWB. In this embodiment of the invention the interface 27 is connected to the multifunction device 100 through a cable 6. The POS terminal 20 and multifunction device 100 are connected 1:1.

The POS terminal 20 has a communication interface 26 connected to a communication line 5, and is connected to the POS server 10 through the communication interface 26. The communication interface 26 may include an Ethernet LAN interface, or a modem or other communication interface circuit.

The multifunction device 100 includes a first interface 110 (first connection unit) that connects to an external device, and a second interface 115 (second connection unit). The first interface 110 connects to the POS terminal 20 through the cable 6. The second interface 115 connects to the printer 200 through another cable 7. The first interface 110 connects 1:1 to the POS terminal 20, and the second interface 115 connects 1:1 to the printer 200.

The multifunction device 100 includes a control unit 150. The control unit 150 includes, for example, a CPU, RAM, ROM, and nonvolatile memory such as an EEPROM or flash memory device (not shown in the figure). The control unit 150 executes a program stored in nonvolatile storage to control other parts. This program could be firmware for operating the multifunction device 100.

The multifunction device 100 includes a roll paper print unit 120 (processing unit, first processing unit), a magnetic reader 130 (processing unit, second processing unit), and a form print unit 140 (processing unit, second processing unit) that operate as controlled by the control unit 150. More specifically, the multifunction device 100 is a multifunction device with a plurality of functions including a function for printing receipts, a function for reading magnetic information from forms, and a form printing function.

The control unit 150 exchanges data with the POS terminal 20 through the first interface 110, and exchanges data with the printer 200 through the second interface 115.

Not shown in the figures, the roll paper print unit 120 has a printhead for printing text and images on roll paper, a conveyance mechanism for conveying the roll paper, a cutter mechanism for cutting the roll paper, and detectors for detecting if roll paper is present and detecting the leading end of the roll paper. The roll paper print unit 120 prints on roll paper as controlled by the control unit 150, and outputs receipts.

The magnetic reader 130 reads information magnetically recorded on checks and other forms that are loaded by the operator. The magnetic reader 130 has a conveyance mechanism that conveys the forms, and an MICR head that reads information (such as the MICR line) magnetically recorded on the conveyed form.

The form print unit 140 prints text indicating that a form has been processed, for example, on the form that is read by the magnetic reader 130. The form print unit 140 has a printhead not shown. The printhead is disposed to a position past which the form is conveyed by the conveyance mechanism of the magnetic reader 130, and prints on the conveyed form.

The printer 200 is a simple printer with a function for printing receipts. The printer 200 has an interface 210 connected to the multifunction device 100 through a cable 7, a roll paper print unit 220 (media processing unit) including a printhead that prints on the roll paper, and a control unit 250 that controls these other parts. The interface 210 is a wired interface with a connector (not shown in the figure) or a wireless interface conforming to the first interface 110 or second interface 115 described above. The control unit 250 exchanges data with the multifunction device 100 through the interface 210.

Configuration of the Media Processing Device

Figure 2:
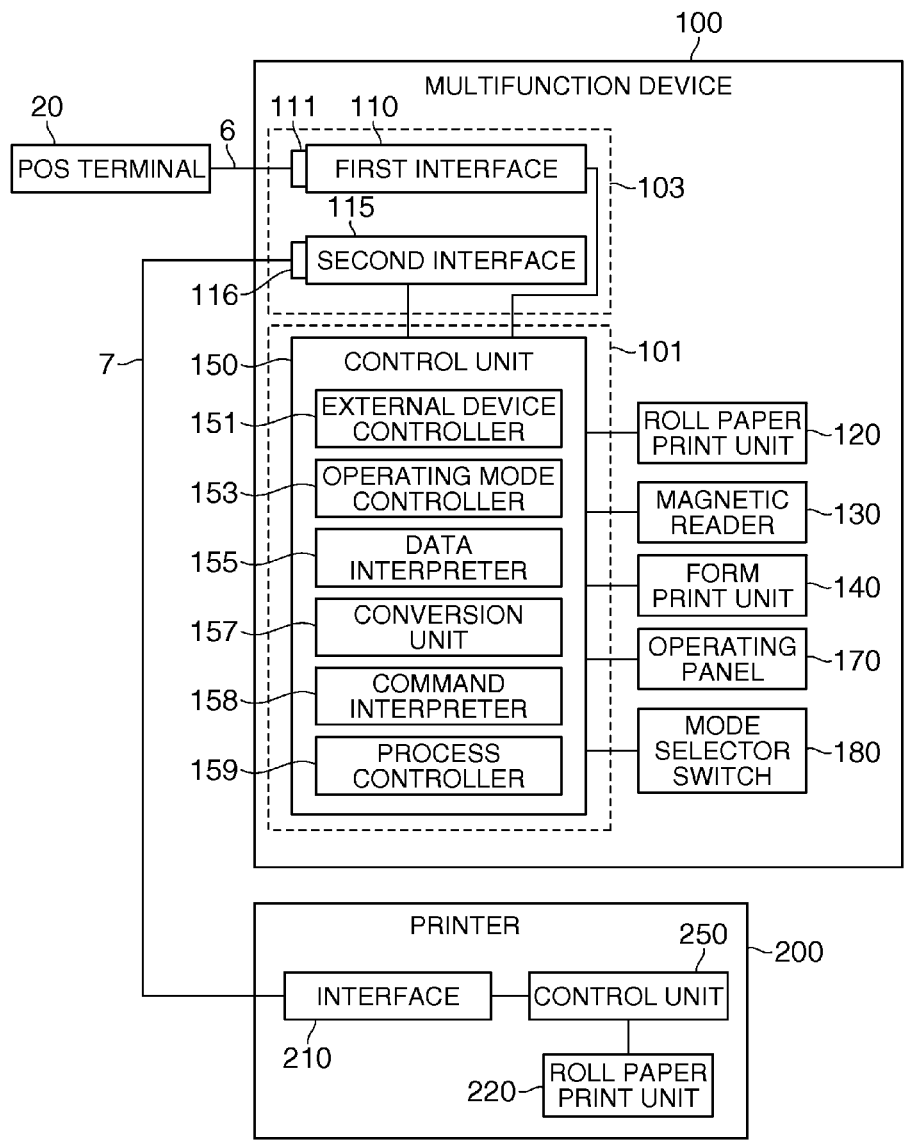
FIG. 2 is a function block diagram showing the configuration of a multifunction device in detail.

The configuration of the multifunction device used as an example of a media processing device is described below with reference to FIG. 2. FIG. 2 is a function block diagram of the POS system 3 showing the configuration of the multifunction device 100 in detail.

As shown in FIG. 2, the multifunction device 100 has a main circuit board 101 containing a CPU and other components for controlling parts of the multifunction device 100, and an interface board 103 disposed separately from the main circuit board 101.

The interface board 103 is connected to the main circuit board 101 through a detachable bus (not shown in the figure), for example, and is removably installed in the multifunction device 100. The first interface 110 and second interface 115 are mounted on the interface board 103, and the control unit 150 is mounted on the main circuit board 101. The main circuit board 101 is also connected to the roll paper print unit 120, magnetic reader 130, form print unit 140, operating panel 170, and mode selector switch 180 of the multifunction device 100.

The first interface 110 has a connector 111 that can connect to the cable 6, and the second interface 115 has a connector 116 that can connect to the other cable 7. These connectors 111, 116 are separately disposed to the interface board 103. In one implementation, the connectors 111, 116 are disposed side by side exposed from the back of the multifunction device 100. The first interface 110 and second interface 115 can communicate separately of each other.

The connectors 111, 116 are connectors that conform to a particular standard such as USB, RS-232C, or Ethernet (R), and can connect to a compatible cable 6, 7.

Alternatively, the first interface 110 and second interface 115 could be wireless communication interfaces enabling connecting to the POS terminal 20 or printer 200 through a wireless connection. Examples of the wireless communication standard include IEEE 802.11, wireless USB, Bluetooth (R), and UWB.

The control unit 150 operates as a external device controller 151, operating mode controller 153 (switch unit), data interpreter 155, conversion unit 157, command interpreter 158, and process controller 159 by means of the CPU mounted on the main circuit board 101 running specific programs.

The external device controller 151 communicates with the device connected to the second interface 115, and determines the type of device (multifunction device or printer), model name, manufacturer, the command set compatible with the device (type of commands), and functions that the device can handle, for example. In this embodiment the external device controller 151 determines at least the types of processes that the device connected to the second interface 115 can execute. Preferably, the external device controller 151 determines the command set that the device connected to the second interface 115 uses. The method whereby the command set is identified could include sending data querying the command set through the second interface 115 and deciding the command set based on the received responses, or identifying the command set of the device by determining the manufacturer or model name of the device connected to the second interface 115, for example. Because a printer 200 is connected to the second interface 115 in this embodiment, the external device controller 151 determines the command set used by the printer 200.

The operating mode controller 153 controls changing the operating mode of the multifunction device 100. When the POS terminal 20 outputs a command for a printing operation, the multifunction device 100 can operate in a first mode in which the multifunction device 100 prints, or a second mode in which the printer 200 is driven to print. The first mode and second mode are selected exclusively.

In other words, in the first mode the multifunction device 100 executes all commands that are received through the first interface 110 and relate to processes that can be executed by the multifunction device 100.

In the second mode, the multifunction device 100 passes commands that are received through the first interface 110 and are related to processes that can be executed by the device connected to the second interface 115 through the second interface 115 to the connected device. The multifunction device 100 executes commands related to processes that cannot be executed by the device connected to the second interface 115.

When a command for printing is received through the first interface 110 in the first mode, the multifunction device 100 prints with the roll paper print unit 120 based on the print data received with the command.

When a command for printing is received in the second mode through the first interface 110, the multifunction device 100 outputs the command and the print data received with the command from the second interface 115. The printer 200 then receives the print data and the print command through the interface 210, and prints with the roll paper print unit 220.

Switching between the first mode and second mode occurs when, for example, a text command is detected by the data interpreter 155 described below, when a mode selector switch 180 of the multifunction device 100 is operated, or when the operating mode is changed by an operation on the operating panel 170 of the multifunction device 100. The mode selector switch 180 is a switch disposed on an outside panel of the multifunction device 100, for example. The mode selector switch 180 could be a pushbutton, touch sensor, or toggle switch, for example. The operating mode controller 153 switches the current operating mode to the other operating mode each time the mode selector switch 180 is operated and turns on. The operating panel 170 includes switches (not shown in the figure) for controlling operation of the multifunction device 100, and indicators (not shown in the figure) that display the operating state of the multifunction device 100. When operation of a particular switch on the operating panel 170 is detected, the operating mode controller 153 changes the operating mode from the current operating mode to the other operating mode. An indicator (not shown in the figure) or display for displaying the current operating mode could also be disposed to the operating panel 170.

The data interpreter 155 interprets the text data contained in the print data received through the first interface 110, and determines if a text command is contained in the text data. A text command is a command contained in print data output by the POS terminal 20. The print data includes text data for printing text, and the text data is a string of text characters and symbols. The text characters and symbols contained in the text data are printed on the receipt and seen by the customer, and therefore typically constitute human-readable content. As a result, strings that do not contain specific meaning as words or symbols (including situations in which specific meaning is not represented by the string) are therefore not printed. For example, the string "$10" expresses a monetary value. However, the string "#1122" is a string with no meaning unless a specific meaning has been assigned to the hash mark (#) symbol. Because strings with no meaning are not printed on the receipt, they can be used as commands that can be interpreted by the multifunction device 100. Command that are thus sent to the multifunction device 100 as part of the text data contained in the print data are referred to as "text commands" herein.

A specific example of a text command is described next. In this example the string "#1122" is predefined as a command that tells the multifunction device 100 to change the operating mode. This predefined command is stored in the nonvolatile memory (not shown in the figure) of the control unit 150. The data interpreter 155 extracts text date from the print data received through the first interface 110, and looks for the string #1122 in the text data. If this string #1122 is found, the data interpreter 155 tells the operating mode controller 153 that a command to change the operating mode was detected. As a result, the operating mode controller 153 switches from the current operating mode to the other operating mode.

Text commands are output as part of the print data. As a result, new commands can be added without changing the command set (command language) used by the POS terminal 20. More specifically, an application program that outputs print data to the printer driver program 24 generates the text data contained in the print data. The printer driver program 24 converts the print data generated by the application program to the data format used by the multifunction device 100, and outputs the converted data with a print command. Therefore, if the application program outputs print data containing a text command, the multifunction device 100 can operate according to the text command even if the printer driver program 24 does not recognize the text command. Desirable commands related to multifunction device 100 operation can therefore be added without changing the content of the printer driver program 24 run by the POS terminal 20.

If a text command is detected in the print data received by the first interface 110, the data interpreter 155 deletes the text command and generates new print data. This prevents printing meaningless strings on the receipt. The data interpreter 155 deletes text commands from the print data in both the first and second modes.

The conversion unit 157 converts the command received by the first interface 110 to a command of the same meaning in a different command set. As described above, the POS terminal 20 generates and outputs commands in a specific command set through a function of the printer driver program 24. The command set may vary according to the manufacturer and model of the device, including the multifunction device 100 and the printer 200. The command set output by the POS terminal 20 and the command set that can be executed by the multifunction device 100 and/or the printer 200 may therefore differ. In this embodiment as described above, the printer 200, or both the multifunction device 100 and the printer 200, cannot execute commands output by the printer driver execution unit 22. In this situation the conversion unit 157 converts the commands output by the printer driver execution unit 22 so that the multifunction device 100 and printer 200 can be driven to execute processes supported by the commands output by the printer driver execution unit 22.

The conversion unit 157 stores a table defining the correlation between commands in at least one command set and commands in another command set. The control unit 150 could store the table relating the command set of commands output by the POS terminal 20 and the command set that can be executed by the multifunction device 100. The control unit 150 could also store a table relating the command set of commands output by the POS terminal 20 and the command set that can be executed by the printer 200. If a command received by the first interface 110 is not a command in a command set that can be executed by the multifunction device 100, the conversion unit 157 converts the command to a command in the command set that can be executed by the multifunction device 100. As a result, the multifunction device 100 can execute all commands received by the first interface 110.

When operating in the second mode and a command received by the first interface 110 is not a command in the command set executable by the printer 200, the conversion unit 157 converts the command to a command in the command set executable by the printer 200. The external device controller 151 can identify commands that are executable by the printer 200. The commands output by the POS terminal 20 can therefore be executed in both the first mode and the second mode even if the command sets of the POS terminal 20 and the multifunction device 100 and/or printer 200 are not the same. As a result, if a printer in the POS system 3 is replaced by a multifunction device 100 or printer 200 of a different make or model, the multifunction device 100 or printer 200 can still be operated without changing the printer driver program 24.

When converting a command received by the first interface 110 to a command compatible with the printer 200, the conversion unit 157 may also change the content of the command or the content of the print data. For example, the resolution of the printhead, the line feed distance, font size, font type, kerning, left and right margins of the roll paper, the roll paper size, and other printing conditions of the printer addressed by the printer driver program 24 may differ from those of the roll paper print unit 120 of the multifunction device 100, or from those of the roll paper print unit 220 of the printer 200. Printing conditions may also differ between the roll paper print unit 120 and the roll paper print unit 220.

In this situation the conversion unit 157 changes the content of the commands and print data so that the same or similar printing results can also be achieved with a printer having different print parameters. For example, the conversion unit 157 may change commands or parameters, including the printing position command, the print margin command, line feed command, font selection command, or kerning command, contained in the commands received by the first interface 110 so that the roll paper print unit 120 produces the same or substantially the same printout as the printout produced by a printer that is compatible with the printer driver program 24. The conversion unit 157 could also convert the pixel count of image data contained in the print data. The conversion unit 157 also converts commands and parameters contained in the commands received by the first interface 110, and the pixel count of image data contained in the print data, so that the roll paper print unit 220 produces the same or similar results as a printer that is compatible with the printer driver program 24. As a result, the same or substantially the same printout can be produced using the multifunction device 100 and the printer 200 without modifying the software running on the POS terminal 20.

The command interpreter 158 interprets commands received by the first interface 110 and identifies the functions corresponding to the received commands. For example, the command interpreter 158 determines if a received command is a command related to a function of the roll paper print unit 120, a command related to a function of the magnetic reader 130, or a command related to a function of the form print unit 140.

If the command received by the first interface 110 is a command related to a function of the magnetic reader 130 or form print unit 140, the command interpreter 158 executes the received command using the process controller 159 described below.

If the command received by the first interface 110 is a command related to a function of the roll paper print unit 120, the command interpreter 158 determines the operating mode of the multifunction device 100. If the operating mode of the multifunction device 100 is the first mode, the command interpreter 158 causes the process controller 159 to execute commands related to the roll paper print unit 120. If the operating mode of the multifunction device 100 is the second mode, the command interpreter 158 sends the commands related to the roll paper print unit 120 through the second interface 115 to the printer 200. If the command received by the first interface 110 accompanies print data, the command interpreter 158 outputs the command and the print data from the second interface 115.

The process controller 159 executes commands received by the first interface 110 and drives the roll paper print unit 120, magnetic reader 130, and form print unit 140 to print a receipt, read magnetic information and print on a form.

Operation of the Media Processing Device

Figure 3:
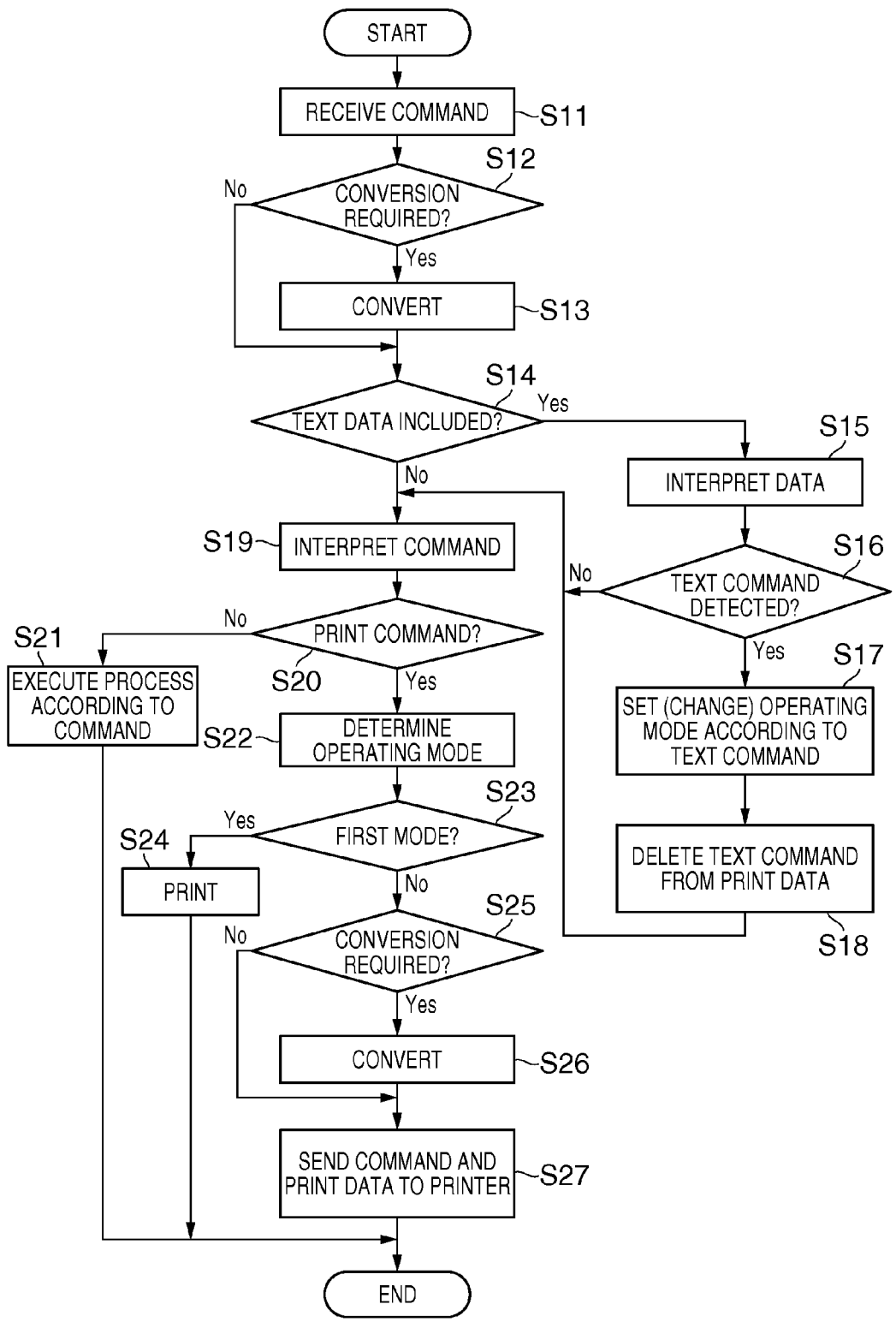
FIG. 3 is a flowchart showing the operation of the multifunction device.

The operation of a multifunction device as an example of a media processing device is described next with reference to FIG. 3. FIG. 3 is a flow chart showing the operation of the multifunction device 100.

As shown in FIG. 3, when the control unit 150 detects that a command was received by the first interface 110 (step S11), the conversion unit 157 determines if the received command must be converted (step S12). If the received command is different from the commands in the command set used by the multifunction device 100, the conversion unit 157 determines that command conversion is required (step S12 returns YES). In this event the conversion unit 157 converts the received command to a compatible command in the command set of the multifunction device 100 (step S13). The conversion unit 157 does not convert the command if command conversion is determined unnecessary (step S12 returns NO).

The data interpreter 155 then determines if text data was received with the command through the first interface 110 (step S14). If text data was received (step S14 returns YES), the data interpreter 155 interprets the received text data (step S15) and searches for a text command (step S16). If a text command is contained in the received text data (step S16 returns YES), the data interpreter 155 outputs the text command to the operating mode controller 153. The operating mode controller 153 then executes the process of changing (setting) the current operating mode to the other operating mode (step S17).

The data interpreter 155 then generates new text data by removing the text command output to the operating mode controller 153 from the received text data (step S18), and goes to the next step S19.

If a text command is not contained in the received text data (step S16 returns NO), the data interpreter 155 goes directly to step S19.

In step S19 the command interpreter 158 interprets the received command, and determines if the received command is a print command (step S20). If the received command is not a print command (step S20 returns NO), the command interpreter 158 outputs the command to the process controller 159, and the process controller 159 controls the magnetic reader 130 or form print unit 140 to execute the process called by the command (step S21).

If the received command is a print command (step S21 returns YES), the data interpreter 155 determines the operating mode set by the operating mode controller 153 (step S22). If the operating mode is the first mode (step S23 returns YES), the data interpreter 155 outputs the command to the process controller 159, and the process controller 159 controls the roll paper print unit 120 to print according to the print command (step S24).

If the operating mode is set to the second mode (step S23 returns NO), the conversion unit 157 determines if command conversion is required (step S25). Because commands are sent to the printer 200 in the second mode, the conversion unit 157 determines that command conversion is required if the command received by the first interface 110 is not a command used by the printer 200 (step S25 returns YES).

In this event the conversion unit 157 converts the command to a command in the command set used by the printer 200 (step S26), and sends the print command and the print data to the printer 200 through the second interface 115 (step S27).

If command conversion is not required (step S25 returns NO), the conversion unit 157 outputs the command and the print data received through the first interface 110 from the second interface 115. Note that the print data sent by the second interface 115 in step S27 is the print data received by the first interface 110 or the print data left after text command removal in step S18.

As described above, a multifunction device 100 in a POS system 3 according to this embodiment of the invention has a roll paper print unit 120 that processes roll paper as the medium; a first interface 110 that receives commands sent from a POS terminal 20; a second interface 115 that sends commands received by the first interface 110 to a printer 200 that performs a process common to the roll paper print unit 120; and a control unit 150 that based on the commands received by the first interface 110 controls processing by the roll paper print unit 120 and controls sending commands through the second interface 115 to the printer 200, and when a command received by the first interface 110 is a specific predetermined command, sends the predetermined command through the second interface 115 to the printer 200.

As a result, the multifunction device 100 can receive commands sent from the POS terminal 20 and print on roll paper using the roll paper print unit 120 based on the received command, and can send a predetermined command causing the printer 200 to print a receipt, for example. As a result, by sending a command to the multifunction device 100, the POS terminal 20 can print with the multifunction device 100 or the command can be appropriately passed to the printer 200. The POS terminal 20 can therefore easily control using the multifunction device 100 and the printer 200 as desired without needing to separately control use of the multifunction device 100 and printer 200.

The multifunction device 100 has a second interface 115 in addition to a first interface 110. As a result, the POS terminal 20 can send commands in the same way as when a single multifunction device 100 is connected. The functions and software of the POS terminal 20 therefore do not need to be specially configured in order to use a plurality of processing devices. This is particularly convenient because existing POS terminals 20 can be used as is without modification.

The control unit 150 sends commands to be executed by the printer 200 in the group of commands received by the first interface 110 through the second interface 115 to the printer 200. As a result, the POS terminal 20 can operate the printer 200 using a function of the multifunction device 100 by sending an appropriate command.

The multifunction device 100 has a magnetic reader 130 and form print unit 140 as second processing units that execute different processes than the roll paper print unit 120, and a external device controller 151 that detects processes that can be executed by the printer 200. When the control unit 150 detects that the printer 200 does not have processing units equivalent to the magnetic reader 130 and form print unit 140, the control unit 150 uses the roll paper print unit 220 to execute commands that are received by the first interface 110 and can be executed by the roll paper print unit 220, which is a processing unit of the printer 200. As a result, by simply outputting commands, the POS terminal 20 can use the printer 200 to execute processes that can be completed by the printer 200, and can use the multifunction device 100 to execute other processes. In other words, the multifunction device 100 can desirably operate the printer 200 based on the function provided by the printer 200. The POS terminal 20 can therefore desirably use a plurality of processing devices without directly controlling the functions of the processing devices.

The multifunction device 100 also has an operating mode controller 153 that, when a command received by the first interface 110 is a command that can be executed by both the roll paper print unit 120 and the roll paper print unit 220 of the printer 200, changes the operating mode to a first mode that executes the command using the roll paper print unit 120, or a second mode that sends the command through the second interface 115 to the printer 200. As a result, the multifunction device 100 can change whether the multifunction device 100 or the printer 200 executes commands that can be executed by either device.

A specific example of how the POS system 3 may be used is described next. In a configuration having the multifunction device 100 and printer 200 in separate locations, the multifunction device 100 and printer 200 can be used differently. For example, when the operator is near the multifunction device 100, the operating mode of the multifunction device 100 is set to the first mode, and the POS system 3 uses the multifunction device 100 to print receipts. When the operator is away from the multifunction device 100 and an operator is not near the multifunction device 100, the multifunction device 100 is switched to the second mode by sending a command from the POS terminal 20. In this scenario receipts are printed by the printer 200. The location where receipts are printed can thus be changed by changing the operating mode of the multifunction device 100.

Embodiment 2

POS System Configuration

Figure 4:
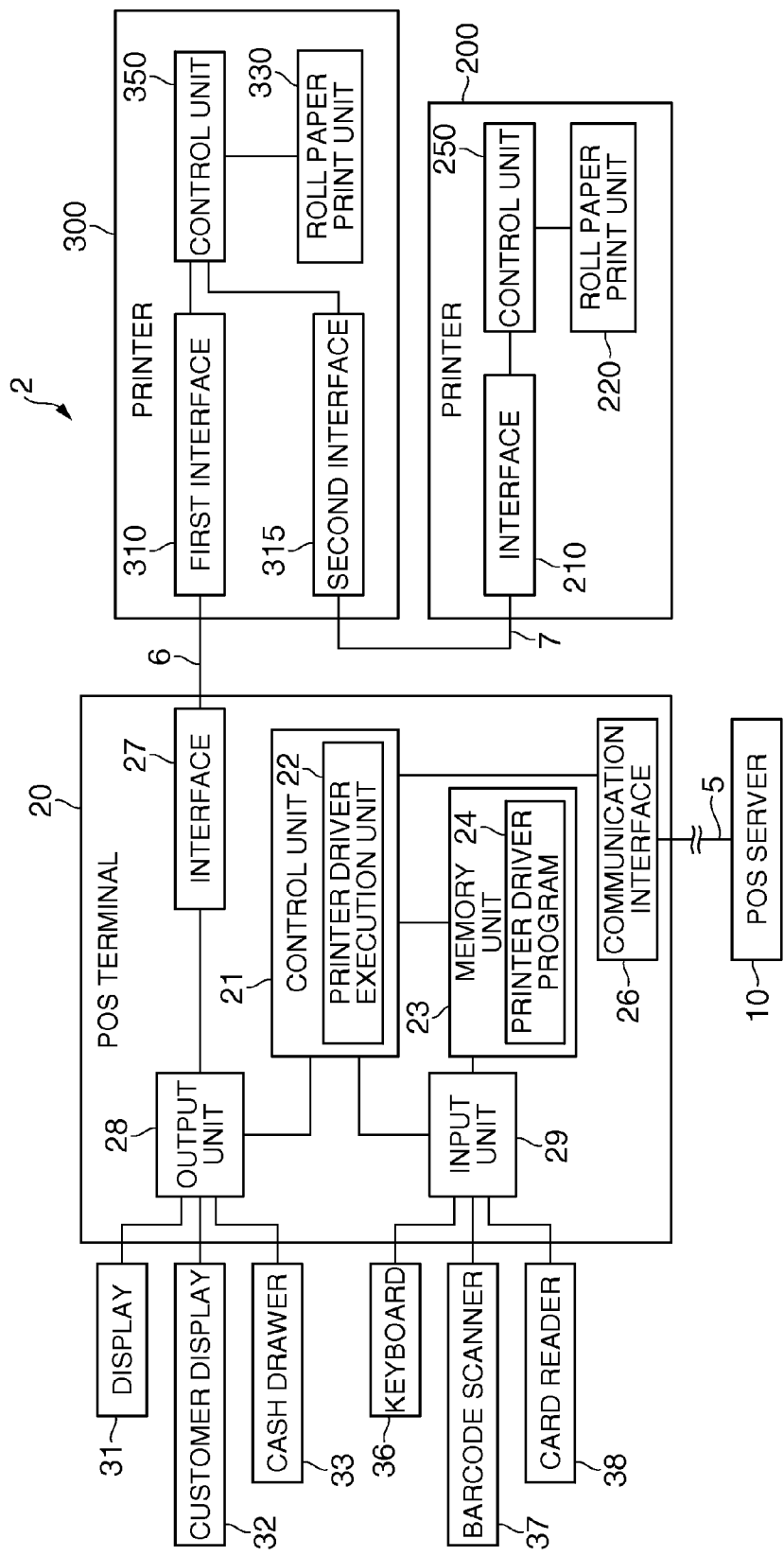
FIG. 4 is a function block diagram of a POS system according to a second embodiment of the invention.

A POS system according to a second embodiment of the invention is described next with reference to FIG. 4. FIG. 4 is a block diagram showing the configuration of the POS system 2 according to the second embodiment of the invention. Note that like parts and content in this and the first embodiment are identified by like reference numerals, and further description thereof is omitted.

As in the first embodiment, the POS system 2 is typically installed in a retail store, for example, and used to register sales data, process transactions, and print receipts at the point of sale.

As shown in FIG. 4, the POS system 2 includes a POS terminal 20 (host computer) operated by an operator, and two printers 200, 300. The two printers 200, 300 are daisy chained. More specifically, one printer 300 (media processing device, or first printer) is connected to the POS terminal 20, and the other printer 200 (external processing device, or second printer) is connected to the first printer 300. Note that the POS system 2 according to the second embodiment of the invention describes an implementation in which a printer 300 is used instead of the multifunction device 100 used as a media processing device (first printer) in the first embodiment described above.

Connected to the POS terminal 20 are an operator display 31 that displays information for the operator, a customer display 32 that displays price and transaction information for the customer, a cash drawer 33 that holds cash and other payment instruments, a keyboard 36 that is used by the operator, a barcode scanner 37 used to read product barcodes, and a card reader 38 used to read magnetic information recorded on magnetic stripe cards such as credit cards and cash cards. The operator inputs product information by operating the keyboard 36 and using the barcode scanner 37 to read barcodes. The POS terminal 20 then queries a POS server 10 based on the input product information.

The POS server 10 searches a product master database based on the product information sent from the POS terminal 20, and returns product code, product name, price, and other product information from the master database to the POS terminal 20. The POS terminal 20 then displays product price information on the display 31 and customer display 32 based on the information returned from the POS server 10. When this process is completed for all products purchased in a transaction, the operator executes a transaction process by operating the keyboard 36, for example, and makes change from the cash drawer 33 as may be necessary. The POS terminal 20 then controls printer 300 or printer 200 to print and output a receipt.

Each printer 200, 300 has a function for printing receipts from roll paper used as the recording medium. The printers 200, 300 could be thermal printers that print receipts on thermal roll paper, or serial dot impact or inkjet printers that print on plain roll paper.

The POS terminal 20 also has a control unit 21 that controls parts of the POS terminal 20. The control unit 21 includes CPU, RAM, ROM, and other peripheral circuits not shown, and runs a program stored in a memory unit 23. The control unit 21 includes a printer driver execution unit 22 that executes a printer driver program 24 stored in the memory unit 23.

The printer driver execution unit 22 generates and sends print data for printing receipts and commands telling a printer connected to the interface 27 to print. The printer driver execution unit 22 executes a printer driver program 24 that is written for a printer or a specific device from a specific manufacturer. As a result, the commands and print data generated by the printer driver execution unit 22 are print data and commands in the command set of a printer from a specific manufacturer or a specific model.

The POS terminal 20 includes an output unit 28 with connectors (not shown in the figure) to which the operator display 31, customer display 32, and cash drawer 33 are connected. The output unit 28 outputs display data from the output unit 28 to the display 31 and customer display 32 as controlled by the control unit 21. The output unit 28 also outputs to the cash drawer 33 a signal that opens the cash drawer 33 as controlled by the control unit 21. The output unit 28 could also have a function for detecting the state (open or closed) of the cash drawer 33, and outputting the result to the control unit 21. An interface 27 to which an external printer is connected is also connected to the output unit 28.

The interface 27 has a connector (not shown in the figure) conforming to a particular standard such as USB, RS-232C, or Ethernet (R), and connect to a printer by a cable connected to this connector. The interface 27 could also be a wireless communication interface enabling connecting a printer through a wireless connection. Examples of the wireless communication standard include IEEE 802.11, wireless USB, Bluetooth (R), and UWB. In this embodiment of the invention the interface 27 is connected to the multifunction device 100 through a cable 6. The POS terminal 20 and multifunction device 100 are connected 1:1.

The POS terminal 20 has a communication interface 26 connected to a communication line 5, and is connected to the POS server 10 through the communication interface 26. The communication interface 26 may include an Ethernet LAN interface, or a modem or other communication interface circuit.

The printer 300 includes a first interface 310 (first connection unit) that connects to an external device, and a second interface 315 (second connection unit). The first interface 310 connects to the POS terminal 20 through the cable 6. The second interface 315 connects to the other printer 200 through another cable 7. The first interface 310 connects 1:1 to the POS terminal 20, and the second interface 315 connects 1:1 to the printer 200.

The printer 300 includes a control unit 350. The control unit 350 includes, for example, a CPU, RAM, ROM, and nonvolatile memory such as an EEPROM or flash memory device (not shown in the figure). The control unit 350 executes a program stored in nonvolatile storage to control other parts. This program could be firmware for operating the printer 300.

The control unit 350 exchanges data with the POS terminal 20 through the first interface 310, and exchanges data with the other printer 200 through the second interface 315. The control unit 350 also controls a roll paper print unit 330 (processing unit, first print unit) and prints receipts.

Not shown in the figures, the roll paper print unit 330 has a printhead for printing text and images on roll paper, a conveyance mechanism for conveying the roll paper, a cutter mechanism for cutting the roll paper, and detectors for detecting if roll paper is present and detecting the leading end of the roll paper. The roll paper print unit 330 prints on roll paper as controlled by the control unit 350, and outputs receipts.

Like the printer 300, the other printer 200 is a simple printer with a function for printing receipts. The printer 200 has an interface 210 connected to the printer 300 through a cable 7, a roll paper print unit 220 (second print unit) including a printhead that prints on the roll paper, and a control unit 250 that controls these other parts. The interface 210 is a wired interface with a connector (not shown in the figure) or a wireless interface conforming to the first interface 310 or second interface 315 described above. The control unit 250 exchanges data with the printer 300 through the interface 210.

Configuration of the Media Processing Device

Figure 5:
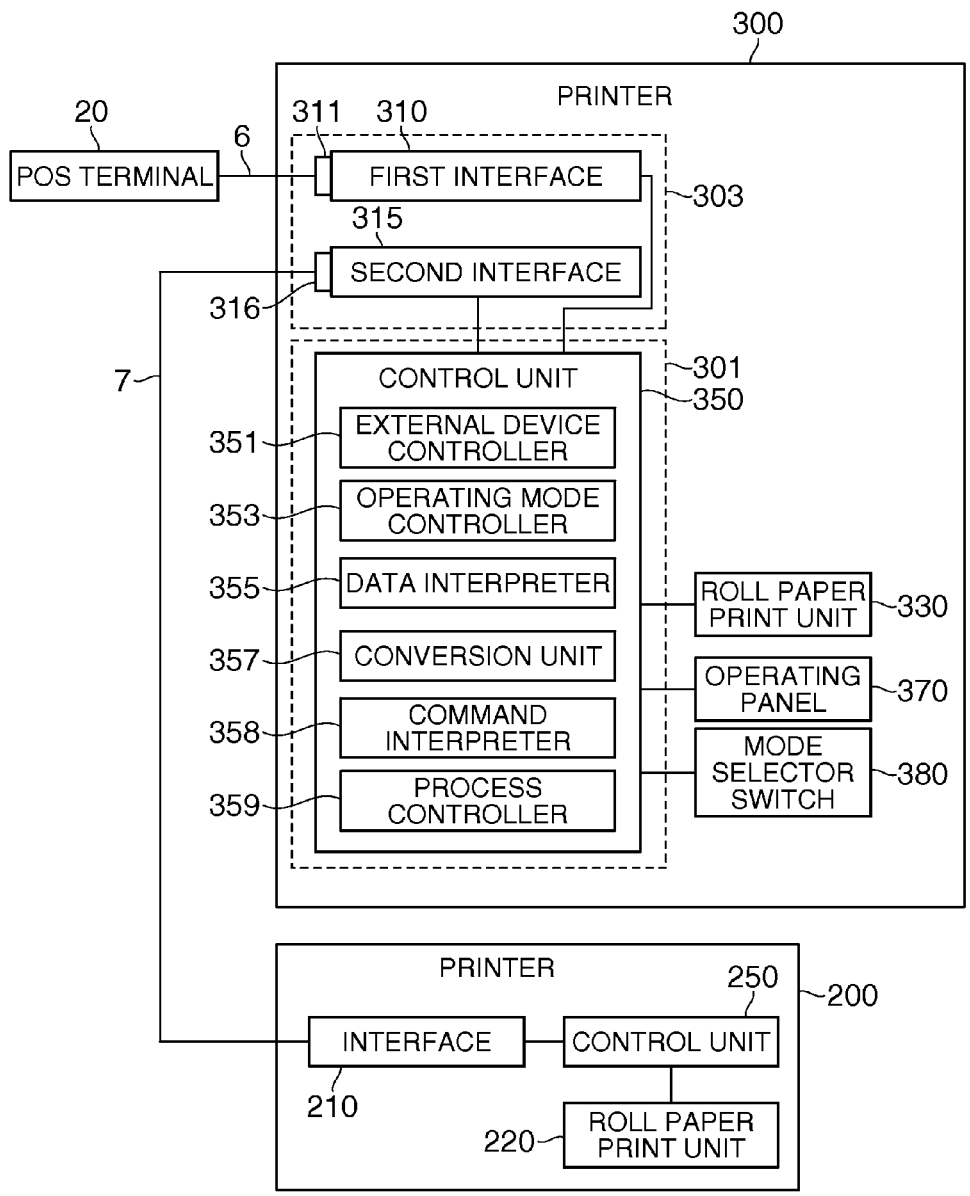
FIG. 5 is a function block diagram showing the configuration of a printer in detail.

The configuration of the printer used as an example of a media processing device in this embodiment is described below with reference to FIG. 5. FIG. 5 is a function block diagram of the POS system 2 showing the configuration of the printer 300 in detail.

As shown in FIG. 5, the printer 300 has a main circuit board 301 containing a CPU and other components for controlling parts of the printer 300, and an interface board 303 disposed separately from the main circuit board 301.

The interface board 303 is connected to the main circuit board 301 through a detachable bus (not shown in the figure), for example, and is removably installed in the printer 300. The first interface 310 and second interface 315 are mounted on the interface board 303, and the control unit 350 is mounted on the main circuit board 301. The main circuit board 301 is also connected to the roll paper print unit 330, operating panel 370, and mode selector switch 380 of the printer 300.

The first interface 310 has a connector 311 that can connect to the cable 6, and the second interface 315 has a connector 316 that can connect to the other cable 7. These connectors 311, 316 are separately disposed to the interface board 303. In one implementation, the connectors 311, 316 are disposed side by side exposed from the back of the printer 300. The first interface 310 and second interface 315 can also communicate separately of each other.

The connectors 311, 316 are connectors that conform to a particular standard such as USB, RS-232C, or Ethernet (R), and can connect to a compatible cable 6, 7.

Alternatively, the first interface 310 and second interface 315 could be wireless communication interfaces enabling connecting to the POS terminal 20 or printer 200 through a wireless connection. Examples of the wireless communication standard include IEEE 802.11, wireless USB, Bluetooth (R), and UWB.

The control unit 350 operates as a external device controller 351, operating mode controller 353, data interpreter 355, conversion unit 357 (conversion unit), command interpreter 358, and process controller 359 by means of the CPU mounted on the main circuit board 301 running specific programs.

The external device controller 351 communicates with the device connected to the second interface 315, and determines the type of device (printer or multifunction device with a function other than printing), model name, manufacturer, the command set compatible with the device (type of commands), and functions that the device can handle, for example. In this embodiment the external device controller 351 determines at least the types of processes that the device connected to the second interface 315 can execute. Preferably, the external device controller 351 determines the command set that the device connected to the second interface 315 uses. The method whereby the command set is identified could include sending data querying the command set through the second interface 315 and deciding the command set based on the received responses, or identifying the command set of the device by determining the manufacturer or model name of the device connected to the second interface 315, for example. Because a printer 200 is connected to the second interface 315 in this embodiment, the external device controller 351 determines the command set used by the printer 200.

The operating mode controller 353 controls changing the operating mode of the printer 300. When the POS terminal 20 outputs a command for a printing operation, the printer 300 can operate in a first mode in which the printer 300 prints, or a second mode in which the printer 200 is driven to print. The first mode and second mode are selected exclusively.

In other words, in the first mode the printer 300 executes all commands that are received through the first interface 310 and can be executed by the printer 300.

In the second mode, the printer 300 passes commands that are received through the first interface 310 and are related to processes that can be executed by the device connected to the second interface 315 through the second interface 315 to the connected device.

When a command for printing is received through the first interface 310 in the first mode, the printer 300 prints with the roll paper print unit 330 based on the print data received with the command.

When a command for printing is received in the second mode through the first interface 310, the printer 300 outputs the command and the print data received with the command from the second interface 315. The printer 200 then receives the print data and the print command through the interface 210, and prints with the roll paper print unit 220.

Switching between the first mode and second mode occurs when, for example, a command for changing the operating mode is received by the first interface 310 of the printer 300. This command could be a text command that is detected by the data interpreter 355 described below, or a printer command that is defined as a command for changing the operating mode of the printer 300.

The printer 300 could also be optionally configured to change the operating mode when the mode selector switch 380 of the printer 300 is operated or when the operating panel 370 of the printer 300 is operated to change the operating mode. The mode selector switch 380 is a switch disposed on the outside of an exterior panel of the printer 300, and could be a pushbutton, touch sensor, or toggle switch, for example.

The operating mode controller 353 switches the current operating mode to the other operating mode each time the mode selector switch 380 is operated and turns on. The operating panel 370 includes switches (not shown in the figure) for controlling operation of the printer 300, and indicators (not shown in the figure) that display the operating state of the printer 300. When operation of a particular switch on the operating panel 370 is detected, the operating mode controller 353 changes the operating mode from the current operating mode to the other operating mode. An indicator (not shown in the figure) or display for displaying the current operating mode could also be disposed to the operating panel 370.

The data interpreter 355 interprets the text data contained in the print data received through the first interface 310, and determines if a text command is contained in the text data. A text command is a command contained in print data output by the POS terminal 20. The print data includes text data for printing text, and the text data is a string of text characters and symbols. The text characters and symbols contained in the text data are printed on the receipt and seen by the customer, and therefore typically constitute human-readable content. As a result, strings that do not contain specific meaning as words or symbols (including situations in which specific meaning is not represented by the string) are therefore not printed. For example, the string "$10" expresses a monetary value. However, the string "#1122" is a string with no meaning unless a specific meaning has been assigned to the hash mark (#) symbol. Because strings with no meaning are not printed on the receipt, they can be used as commands that can be interpreted by the printer 300. Commands that are thus sent to the printer 300 as part of the text data contained in the print data are referred to as "text commands" herein.

A specific example of a text command is described next. In this example the string "#1122" is predefined as a command that tells the multifunction device 300 to change the operating mode. This predefined command is stored in the nonvolatile memory (not shown in the figure) of the control unit 350. The data interpreter 355 extracts text date from the print data received through the first interface 310, and looks for the string #1122 in the text data. If this string #1122 is found, the data interpreter 355 tells the operating mode controller 353 that a command to change the operating mode was detected. As a result, the operating mode controller 353 switches from the current operating mode to the other operating mode.

Text commands are output as part of the print data. As a result, new commands can be added without changing the command set (command language) used by the POS terminal 20. More specifically, an application program that outputs print data to the printer driver program 24 generates the text data contained in the print data. The printer driver program 24 converts the print data generated by the application program to the data format used by the printer 300, and outputs the converted data with a print command. Therefore, if the application program outputs print data containing a text command, the printer 300 can operate according to the text command even if the printer driver program 24 does not recognize the text command. Desirable commands related to printer 300 operation can therefore be added without changing the content of the printer driver program 24 run by the POS terminal 20.

If a text command is detected in the print data received by the first interface 310, the data interpreter 355 deletes the text command and generates new print data. This prevents printing meaningless strings on the receipt. The data interpreter 355 deletes text commands from the print data in both the first and second modes.

The conversion unit 357 converts the command received by the first interface 310 to a command of the same meaning in a different command set. As described above, the POS terminal 20 generates and outputs commands in a specific command set through a function of the printer driver program 24. The command set may differ according to the manufacturer and model of the device, including the printers 200, 300. The command set output by the POS terminal 20 and the command set that can be executed by printer 300 and/or printer 200 may therefore differ.

The conversion unit 357 stores a table defining the correlation between commands in at least one command set and commands in another command set. The control unit 350 could store a table relating the command set of commands output by the POS terminal 20 and the command set that can be executed by the printer 300. The control unit 350 could also store a table relating the command set of commands output by the POS terminal 20 and the command set that can be executed by the printer 200.

If a command received by the first interface 310 is not a command in a command set that can be executed by the printer 300, the conversion unit 357 converts the command to a command in the command set that can be executed by the printer 300 (first executable command). As a result, the printer 300 can execute all commands received by the first interface 310.

When operating in the second mode and a command received by the first interface 310 is not a command in the command set executable by the printer 200, the conversion unit 357 converts the command to a command in the command set executable by the printer 200 (second executable command). The external device controller 351 can identify commands that are executable by the printer 200. The commands output by the POS terminal 20 can therefore be executed in both the first mode and the second mode even if the command sets of the POS terminal 20 and printer 300 and/or printer 200 are not the same. As a result, if a printer in the POS system 2 is replaced by a printer 300 or printer 200 of a different make or model, the printer 300 or printer 200 can still be operated without changing the printer driver program 24.

When converting a command received by the first interface 310 to a command compatible with the printer 200, the conversion unit 357 may also change the content of the command or the content of the print data. For example, the resolution of the printhead, the line feed distance, font size, font type, kerning, left and right margins of the roll paper, the roll paper size, and other printing conditions of the printer addressed by the printer driver program 24 may differ from those of the roll paper print unit 330 of printer 300, or from those of the roll paper print unit 220 of printer 200. Printing conditions may also differ between the roll paper print unit 330 and the roll paper print unit 220.

In this situation the conversion unit 357 changes the content of the commands and print data so that the same or similar printing results can also be achieved with a printer having different print parameters. For example, the conversion unit 357 may change commands or parameters, including the printing position command, the print margin command, line feed command, font selection command, or kerning command, contained in the commands received by the first interface 310 so that the roll paper print unit 330 produces the same or substantially the same printout as the printout produced by a printer that is compatible with the printer driver program 24. The conversion unit 357 could also convert the pixel count of image data contained in the print data.

The conversion unit 357 also converts commands and parameters contained in the commands received by the first interface 310, and the pixel count of image data contained in the print data, so that the roll paper print unit 220 produces the same or similar results as a printer that is compatible with the printer driver program 24. As a result, the same or substantially the same printout can be produced using either printer 200, 300 without modifying the software running on the POS terminal 20.

The command interpreter 358 interprets commands received by the first interface 310 and identifies the functions corresponding to the received commands. For example, the command interpreter 358 determines if a received command is a command related to a function of the roll paper print unit 330, or a command related to another function. Commands related to functions other than printing include, for example, commands related to a function for reading magnetic information recorded on checks or other forms, and commands related to printing on manually inserted forms such as checks.

If the command received by the first interface 310 is a command related to a function other than a function of the roll paper print unit 330, the command interpreter 358 discards the command. This is because the command cannot be executed by printer 300 or printer 200.

If the command received by the first interface 310 is a command related to a function of the roll paper print unit 330, the command interpreter 358 determines the operating mode of the printer 300. If the operating mode of the printer 300 is the first mode, the command interpreter 358 causes the process controller 359 to execute commands related to the roll paper print unit 330.

If the operating mode of the multifunction device 300 is the second mode, the command interpreter 358 sends the commands related to the roll paper print unit 330 through the second interface 315 to the printer 200. If the command received by the first interface 310 accompanies print data, the command interpreter 358 outputs the command and the print data from the second interface 315.

The process controller 359 executes commands received by the first interface 310 and drives the roll paper print unit 330 to print a receipt.

Operation of the Media Processing Device

Figure 6:
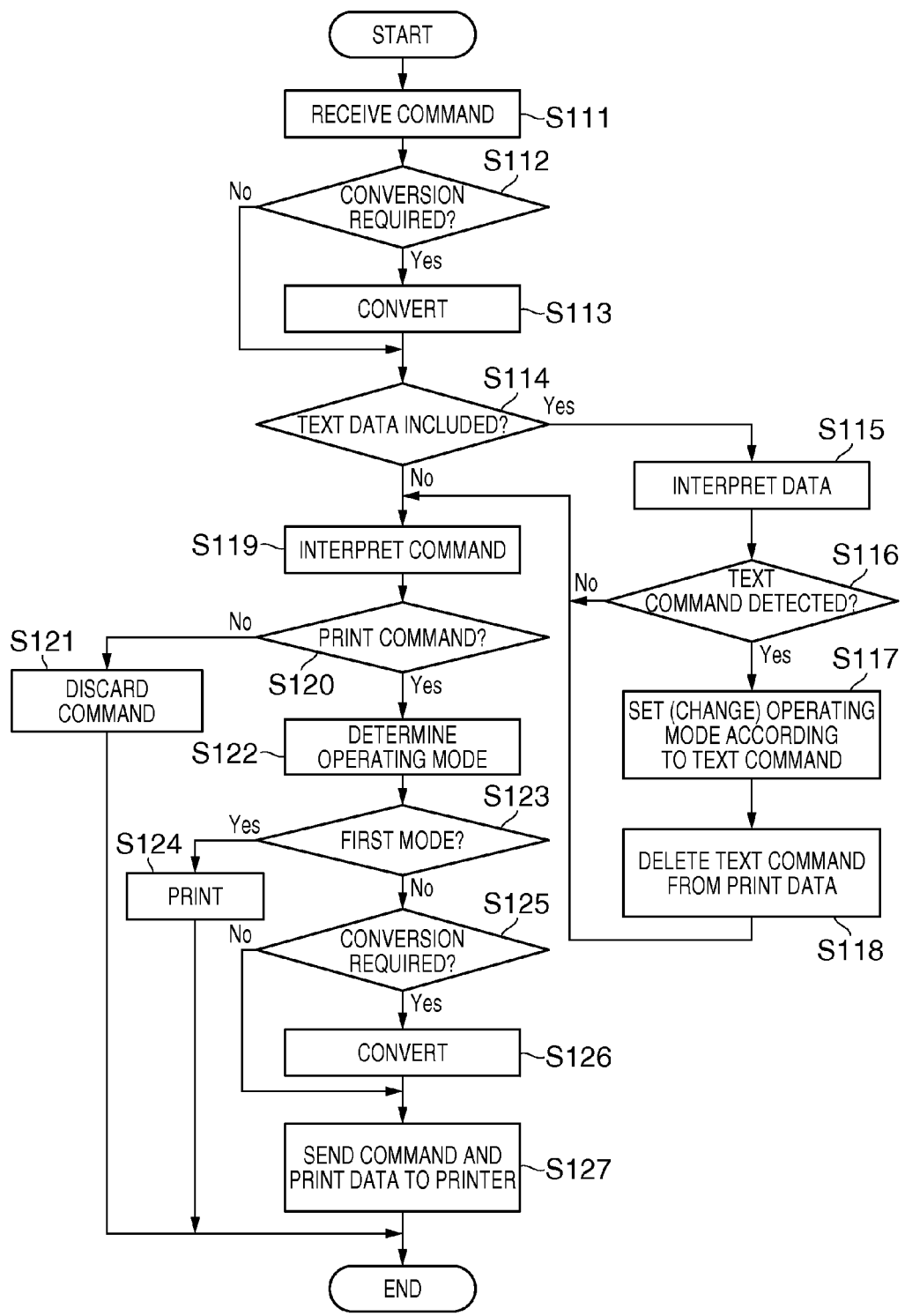
FIG. 6 is a flow chart of printer operation.

The operation of the printer 300 as an example of a media processing device is described next with reference to FIG. 6. FIG. 6 is a flow chart showing the operation of the printer 300.

As shown in FIG. 6, when the control unit 350 detects that a command was received by the first interface 310 (step S111), the conversion unit 357 determines if the received command must be converted (step S112). If the received command is different from the commands in the command set used by the printer 300, the conversion unit 357 determines that command conversion is required (step S112 returns YES). In this event the conversion unit 357 converts the received command to a compatible command in the command set of the printer 300 (step S113). The conversion unit 357 does not convert the command if command conversion is determined unnecessary (step S112 returns NO).

The data interpreter 355 then determines if text data was received with the command through the first interface 310 (step S114). If text data was received (step S114 returns YES), the data interpreter 355 interprets the received text data (step S115) and searches for a text command (step S116). If a text command is contained in the received text data (step S116 returns YES), the data interpreter 355 outputs the text command to the operating mode controller 353. The operating mode controller 353 then executes the process of changing (setting) the current operating mode to the other operating mode (step S117).

The data interpreter 355 then generates new text data by removing the text command output to the operating mode controller 353 from the received text data (step S118), and goes to the next step S119.

If a text command is not contained in the received text data (step S116 returns NO), the data interpreter 355 goes directly to step S119.

In step S119 the command interpreter 358 interprets the received command, and then determines if the received command is a command instructing executing a process, and if the process to be executed is printing on roll paper (step S120). Control commands that can be executed by the printer 300 are executed by the control unit 350 regardless of whether the command is related to printing on roll paper. More specifically, the control unit 350 immediately executes control commands such as commands from the POS terminal 20 requesting the printer 300 to return the printer status, commands instructing going to a sleep mode, commands for waking from the sleep mode, and commands instructing changing the operating mode, for example, regardless of the flow chart shown in FIG. 6.

If the received command is a command for executing a process (function) other than printing on roll paper (step S120 returns NO), the command interpreter 358 discards the command (step S121) and ends this process.

If the received command is a command related to the roll paper print function (step S121 returns YES), the data interpreter 355 determines the operating mode set by the operating mode controller 353 (step S122). If the operating mode is the first mode (step S123 returns YES), the data interpreter 355 outputs the command to the process controller 359, and the process controller 359 controls the roll paper print unit 330 to print according to the print command (step S124).

However, if the operating mode is set to the second mode (step S123 returns NO), the conversion unit 357 determines if command conversion is required (step S125). Because commands are sent to printer 200 in the second mode, the conversion unit 357 determines that command conversion is required if the command received by the first interface 310 is not a command used by the printer 200 (step S125 returns YES).

In this event the conversion unit 357 converts the command to a command in the command set used by the printer 200 (step S126), and sends the print command and the print data to the printer 200 through the second interface 315 (step S127).

If command conversion is not required (step S125 returns NO), the conversion unit 357 outputs the command and the print data received through the first interface 310 from the second interface 315. Note that the print data output by the second interface 315 in step S127 is the print data received by the first interface 310 or the print data left after text command removal in step S118.

As described above, a POS system 2 according to the second embodiment of the invention includes a POS terminal 20 that outputs transaction information and commands, a first printer 300, and a second printer 200.

The first printer 300 has a first interface 310 that receives the transaction information and commands output from the POS terminal 20; a second interface 315 that outputs the transaction information; a roll paper print unit 330 that prints receipts; and a control unit 350 that controls switching between a first mode and a second mode based on a command received through the first interface 310. In the first mode, the roll paper print unit 330 executes the command received through the first interface 310 to print transaction information on a receipt, and in the second mode the control unit 350 outputs the transaction information received by the first interface 310 from the second interface 315.

The second printer 200 has an interface 210 that connects to the second interface 315 of the first printer 300, and receives transaction information therefrom; and a roll paper print unit 220 that prints transaction information received by the interface 210 on a receipt.

As a result, the printer 300 can receive commands from the POS terminal 20, and selectively operate in a first mode that prints on roll paper based on the received command, or a second mode that sends the commands to the other printer 200 so that the printer 200 prints on roll paper. Because this printer 300 switches the operating mode between the first mode and second mode based on a command sent from the POS terminal 20, the POS terminal 20 can desirably switch the printer that prints on roll paper to either printer 200, 300 by outputting the appropriate command. Plural printers can therefore be selectively used without a complicated control process.

Furthermore, because the printer 300 has a conversion unit 357 that converts commands received by the first interface 310 to first executable commands that are executed by the roll paper print unit 330 or second executable commands that are executed by the other printer 200, the printers 200, 300 can be desirably operated without modifying the commands output by the POS terminal 20 even if the printers 200, 300 are connected to POS terminals 20 that use different commands.

Furthermore, because the roll paper print unit 330 prints transaction information received by the first interface 310 on a receipt, and the second interface 315 does not send the transaction information to the other printer 200, when the control unit 350 of the printer 300 changes to the first mode, the printer 200 does not print a receipt when printer 300 prints a receipt. Because printer 300 and printer 200 can therefore be operated exclusively to print receipts, printing two receipts with the same transaction information can be prevented, and reliability as a POS system that outputs transaction information can be improved.

In addition, when the control unit 350 of the printer 300 changes to the second mode, the conversion unit 357 converts the command received by the first interface 310 to a second executable command, the second interface 315 sends the transaction information and second executable command to the printer 200, and the printer 200 receives the transaction information and second executable command through the reception unit thereof and prints the transaction information on a receipt with the roll paper print unit 220. As a result, the printer 200 can be desirably operated without changing the command set of the POS terminal 20 even when the printer 200 is connected to a POS terminal 20 that uses a different command set.

The invention is described above with reference to a preferred embodiment thereof, but the invention is not limited thereto and can be modified and adapted in many ways without departing from the scope of the accompanying claims. Examples of such variations are described below.

For example, the effect of the invention can also be achieved with configurations that do not include the function of one or more of the external device controller 151, operating mode controller 153, data interpreter 155, conversion unit 157, command interpreter 158, and process controller 159 of the multifunction device 100 in the embodiment described above. For example, in a device that connects to the second interface 115 and has information about the command set and types of processes that it can execute preset in the control unit 150, the printer 200 detection function of the external device controller 151 can be omitted.

Further alternatively, if the multifunction device 100 and printer 200 are compatible with the command set of the commands output by the POS terminal 20, the command conversion function of the conversion unit 157 can be omitted.

Further alternatively, the function of detecting text commands by means of the data interpreter 155 can be omitted in an implementation that does not use text commands and has a command whereby the POS terminal 20 tells the multifunction device 100 to change the operating mode defined in the same way as a print command, for example.

Yet further alternatively, when commands that are received by the first interface 110 and then passed on from the second interface 115 are set individually or by corresponding function in the control unit 150, the command interpretation function of the command interpreter 158 can be omitted because the operating mode controller 153 can send the command from the second interface 115 when the received command is one of these defined commands.

Yet further, because the operating mode can be changed by operating the mode selector switch 180 or operating panel 170 in the embodiment described above, the invention can also be used without using a text command or other command that commands changing the operating mode.

A configuration having a multifunction device 100 and printer 200 that print on roll paper is described above as an example of a media processing device that processes media and an external processing device in the foregoing embodiment, but the invention is not so limited. For example, the media is plastic sheets and media with a coated surface can also be used. Other examples of usable media include cut-sheet media of a predefined size, and continuous media such as sprocket-feed paper. Photocopier paper can also be used as the media.

The roll paper print units 120, 220 are also not limited to thermal print units that print by applying heat to thermal paper, and could use other recording methods including inkjet and dot impact.

A magnetic reader 130 and form print unit 140 are also described in the foregoing embodiment as examples of non-printing process units of the multifunction device 100, but the invention is not so limited. For example, these other processing units could be print units that print on different types of media, a scanner that optically reads checks or other media, or an authentication unit that reads an IC card.

For example, the effect of the invention can also be achieved with configurations that do not include the function of one or more of the external device controller 351, operating mode controller 353, data interpreter 355, conversion unit 357, command interpreter 358, and process controller 359 of the printer 300 in the embodiment described above. For example, in a device that connects to the second interface 315 and has information about the command set and types of processes that it can execute preset in the control unit 350, the printer 200 detection function of the external device controller 351 can be omitted.

Further alternatively, if the printers 200, 300 are compatible with the command set of the commands output by the POS terminal 20, the command conversion function of the conversion unit 357 can be omitted.

Further alternatively, the function of detecting text commands by means of the data interpreter 355 can be omitted in an implementation that does not use text commands and has a command whereby the POS terminal 20 tells the printer 300 to change the operating mode defined in the same way as a print command, for example.

Yet further alternatively, when commands that are received by the first interface 310 and then passed on from the second interface 315 set individually or by corresponding function in the control unit 350, the command interpretation function of the command interpreter 358 can be omitted because the operating mode controller 353 can send the command from the second interface 315 when the received command is one of these defined commands.

Yet further, because the operating mode can be changed by operating the mode selector switch 380 or operating panel 370 in the embodiment described above, the invention can also be used without using a text command or other command that commands changing the operating mode.

A configuration having printers 200, 300 that print on roll paper is described above as an example of a media processing device that processes media and an external processing device in the foregoing embodiment, but the invention is not so limited. For example, the media is plastic sheets and media with a coated surface can also be used. Other examples of usable media include cut-sheet media of a predefined size, and continuous media such as sprocket-feed paper. Photocopier paper can also be used as the media.

The roll paper print units 330, 220 are also not limited to thermal print units that print by applying heat to thermal paper, and could use other recording methods including inkjet and dot impact.

A POS terminal 20 is also described in the foregoing embodiments as an example of a host computer, but the invention is not so limited. The host computer can be any device with the ability to send commands and text data to a multifunction device 100, printer 300, or other media processing device, and could be a common personal computer, a mainframe computer, a server, or other computer device, or a mobile device. The application of the host computer is also not limited to processing transactions in a POS system, and the invention can also be used in systems including a computer that is used for common applications such as document processing and image editing, or for other specialized applications.

The function blocks shown in FIG. 1, FIG. 2, FIG. 4, and FIG. 5 can be desirably achieved by the cooperation of hardware and software, and do not suggest a specific hardware configuration.

For example, the function of the control unit 150, 350 can be achieved by the control unit 150, 350 of the multifunction device 100 or printer 300 executing a program stored on an externally connected storage medium. The details of such a configuration can obviously also be changed as desired.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A media processing device comprising:
 a processing unit that processes media;
 a first connection unit that receives a command sent from a host computer;
 a second connection unit that transmits the command received by the first connection unit;
 a control unit that controls executing a process by the processing unit based on the command received by the first connection unit, or controls transmitting the command received by the first connection unit from the second connection unit; and
 a second processing unit that executes a different process than the processing unit; and
 an external device control unit that detects a process that can be executed by an external processing device;
 wherein the external device control unit detects that the external processing device does not have a processing unit that is the same as the second processing unit, and
 wherein the control unit causes the second processing unit to execute the command received by the first connection unit.

2. The media processing device described in claim 1, wherein:
 when the command received by the first connection unit is a preset command, the control unit transmits the preset command from the second connection unit to the external processing device.

3. The media processing device described in claim 2, further comprising:
 a switching unit that, when the command received by the first connection unit can be executed by the processing unit and the external processing device, changes to a first mode that executes the command by the processing unit, or a second mode that transmits the command by the second connection unit to the external processing device.

4. The media processing device described in claim 2, further comprising:
 a conversion unit that converts the command received by the first connection unit to a first executable command that is executed by the processing unit, or a second executable command that is executed by the external processing device.

5. A media processing system comprising:
 a terminal that transmits a command;
 a first media processing device including a first processing unit that applies a first process to media,
  a first connection unit that receives the command transmitted from the terminal,
  a control unit that controls executing a process by the first processing unit based on the command received by the first connection unit, or controls transmitting the command received by the first connection unit,
  a second connection unit that transmits the command when the control unit executes control to transmit the command,
  a second processing unit that executes a different process than the first processing unit, and
  an external device control unit that detects a process that can be executed by an external processing device; and
 a second media processing device including a receiving unit that connects to the second connection unit of the first media processing device and receives the command transmitted from the second connection unit, and a media processing unit that executes a same process as the first processing unit of the first media processing device based on the command received by the receiving unit;

wherein the external device control unit detects that the second media processing device does not have a processing unit that is the same as the second processing unit, and wherein the control unit causes the second processing unit to execute the command received by the first connection unit.

6. The media processing system described in claim 5, wherein:

when the command received by the first connection unit is a preset command, the control unit of the first media processing device transmits the preset command from the second connection unit to the second media processing device.

7. The media processing system described in claim 5, wherein:

the first processing unit of the first media processing device is a print unit that prints on roll paper, and the second processing unit is a reading unit that reads information recorded on cut-sheet media.

8. The media processing system described in claim 5, wherein:

the first media processing device includes a switching unit that, when the command received by the first connection unit can be executed by the processing unit and the external processing device, changes to a first mode that executes the command by the processing unit, or a second mode that transmits the command by the second connection unit to the external processing device.

9. The media processing system described in claim 5, wherein:

the first media processing device includes a conversion unit that converts the command received by the first connection unit to a first executable command that is executed by the processing unit, or a second executable command that is executed by the external processing device.

10. A POS system comprising:

a POS terminal that transmits transaction information and a command;

a first printing device including a first connection unit that receives transaction information and the command transmitted from the POS terminal, a first print unit that prints a receipt and includes a first processing unit, a control unit that executes a first mode wherein the first processing unit executes the command received by the first connection unit and the first print unit prints the transaction information on a receipt, or a second mode wherein the transaction information received by the first connection unit is transmitted, a second connection unit that transmits the transaction information when the control unit operates in the second mode, and a second processing unit that executes a different process than the first processing unit, and external device control unit that detects a process that can be executed by an external processing device; and a second printing device including a receiving unit that connects to the second connection unit of the first printing device and receives the transaction information, and a second print unit that prints the transaction information received by the receiving unit on a receipt;

wherein the external device control unit detects that the second printing device does not have a processing unit that is the same as the second processing unit, and wherein the control unit causes the second processing unit to execute the command received by the first connection unit.

11. The POS system described in claim 10, wherein:

when the command received by the first connection unit is a preset command, the control unit of the first printing device transmits the preset command from the second connection unit to the second printing device.

12. The POS system described in claim 10, wherein:

the first printing device includes a conversion unit that converts the command received by the first connection unit to a first executable command that is executed by the first print unit, or a second executable command that is executed by the second printing device.

13. The POS system described in claim 12, wherein:

when the control unit of the first printing device executes the first mode, the first print unit prints the transaction information received by the first connection unit on a receipt, and the second connection unit does not transmit the transaction information to the second printing device.

14. The POS system described in claim 12, wherein:

when the control unit of the first printing device executes the second mode, the conversion unit converts the command received by the first connection unit to the second executable command, the second connection unit transmits the second executable command to the second printing device, and the second printing device receives the second executable command through the receiving unit, and prints the transaction information on a receipt by the second print unit based on the second executable command.

* * * * *